US012264801B2

(12) United States Patent
Liu et al.

(10) Patent No.: US 12,264,801 B2
(45) Date of Patent: Apr. 1, 2025

(54) ANTI-LIGATURE LIGHTING FIXTURE

(71) Applicant: Viscor, Inc., Toronto (CA)

(72) Inventors: Song Liu, Woodbridge (CA); Sandu Cusmariu, Thornhill (CA); Antonio Magisano, Woodbridge (CA)

(73) Assignee: Viscor, Inc., Toronto (CA)

( * ) Notice: Subject to any disclaimer, the term of this patent is extended or adjusted under 35 U.S.C. 154(b) by 0 days.

(21) Appl. No.: 18/563,197

(22) PCT Filed: Jun. 7, 2021

(86) PCT No.: PCT/IB2021/054989
§ 371 (c)(1),
(2) Date: Nov. 21, 2023

(87) PCT Pub. No.: WO2022/259014
PCT Pub. Date: Dec. 15, 2022

(65) Prior Publication Data

US 2024/0142072 A1 May 2, 2024

(51) Int. Cl.
*F21S 8/02* (2006.01)
*F21V 15/00* (2015.01)
*F21V 15/01* (2006.01)
*F21W 131/20* (2006.01)

(52) U.S. Cl.
CPC ............ *F21S 8/026* (2013.01); *F21V 15/005* (2013.01); *F21V 15/01* (2013.01); *F21W 2131/20* (2013.01)

(58) Field of Classification Search
CPC ......... F21S 8/026; F21V 15/005; F21V 15/01
See application file for complete search history.

(56) References Cited

U.S. PATENT DOCUMENTS 7,325,939 B2 * 2/2008 Wilson .................... F21V 15/01 362/147
10,627,080 B2 * 4/2020 Wilson ...................... F21S 8/03
10,881,013 B1 12/2020 Marker
2011/0228525 A1 * 9/2011 Vermeland ............ F21V 15/005 362/217.11
2020/0025331 A1 1/2020 Dorrian et al.
2021/0054980 A1 * 2/2021 Garrett .................. F21V 21/048

FOREIGN PATENT DOCUMENTS

EP 2426403 A2 3/2012

OTHER PUBLICATIONS

International Search Report and Written Opinion of the International Application No. PCT/IB2021/054989, mailed on Feb. 25, 2022, 9 pages.

* cited by examiner

*Primary Examiner* — William N Harris
(74) *Attorney, Agent, or Firm* — KDW Firm PLLC

(57) ABSTRACT

A lighting fixture arranged and configured for use in an anti-ligature or ligature resistant environment or facility is disclosed. In one embodiment, the lighting fixture includes an inset door The lighting fixture includes an angled or beveled edge, wall, or surface along an outer periphery of the inset door so that a beveled, enlarged triangular opening is formed between the inset door and the enclosure of the lighting fixture. In use, the beveled opening eliminates any channel or access point between the inset door and the enclosure in which an object may be wedged.

12 Claims, 5 Drawing Sheets

ANTI-LIGATURE LIGHTING FIXTURE

CROSS-REFERENCE TO RELATED APPLICATIONS

This application is a National Phase filing of International Application No. PCT/IB2021/054989, filed Jun. 7, 2021, entitled "Anti-Ligature Lighting Fixture," which application is incorporated by reference herein in its entirety.

TECHNICAL FIELD

The present disclosure is directed to lighting fixtures and, more particularly, to a lighting fixture arranged and configured for use in an anti-ligature or ligature resistant environment or facility.

BACKGROUND

Lighting fixtures are well known. Lighting fixtures may be used in a variety of different spaces. Within some spaces, such as, for example, medical spaces, patients' rooms, etc., the lighting fixtures may need to be specially designed for the particular application, this is in contrast to general spaces when a standard office lighting fixture may be used. One such space is anti-ligature or ligature resistant environments or facilitates such as, for example, behavioral health facilities, correctional institutions (e.g., prisons), etc. In anti-ligature or ligature resistant environments or facilities, lighting fixtures are designed for easy cleanability, enhanced water and dust resistance, multiple functions such as ambient and exam light levels, reading lights and night lights. In addition, lighting fixtures are arranged and configured to reduce the risk of ligature (e.g., self-harm to the occupant). That is, anti-ligature or ligature resistant environments or facilities often house occupants that are at risk for self-harm including, for example, hanging. The risk of self-harm increases in areas where the occupants are not under constant supervision such as, for example, in occupants' rooms. As such, the design and construction of spaces to house occupants who are at risk of self-harm requires special considerations, and all objects in the room including lighting fixtures, doors, windows, ventilation, furniture, etc. are designed to eliminate potential harms including potential points of ligature. Thus, lighting fixtures designed and configured for use in anti-ligature or ligature resistant environments or facilities are designed and configured to eliminate potential vulnerability points of ligature or other hazards which could provide an occupant with a vector for self-harm.

Generally speaking, lighting fixtures provide one such vector. For example, if not designed properly, lighting fixtures could provide occupants with a point of ligature for self-harm. That is, any seams or gaps in the design or construction of the fixture or between the fixture and the ceiling surface to which the lighting fixture is mounted may create a point of vulnerability that may be used by the occupant to inflict self-harm.

As such, when used in anti-ligature or ligature resistant environments or facilities, lighting fixtures are often designed to eliminate unwanted seams or gaps. For example, referring to FIG. 1, a known conventional lighting fixture 100 utilizing an inset door is illustrated. Generally speaking, an inset door lighting fixture 100 includes an enclosure 110 having a flange 120 extending laterally therefrom. As will be readily appreciated by one of ordinary skill in the art, in use, the lighting fixture 100 is positioned within an opening formed in a ceiling. Once properly positioned, the flange 120 abuts the ceiling and in at least one application caulk is applied between the flange 120 of the lighting fixture 110 and the ceiling surface. Application of the caulk ensures that the lighting fixture 100 is properly secured to the ceiling surface.

One advantage of such an inset door lighting fixture 100 is that the inset door 150 (located laterally inward of the flange 120) may be easily secured to the enclosure 110 via a plurality of screws 151. Thus arranged, access to the interior of the lighting fixture 100 is easily enabled via removal of the screws 151. As such, maintenance may be quickly and easily performed on inset door lighting fixtures 100. Additionally, a gasket or seal is often positioned within the interior of the enclosure 110 between the inset door 150 and the inner surface of the enclosure 110 to create a waterproof seal thereby enabling easier cleaning (e.g., enabling spray down). However, inset door lighting fixtures 100 generally incorporate a gap between the outer edge of the inset door 150 and the inner surface of the enclosure 110 (e.g., a gap is created between the parallel walls of the outer periphery of the inset door and the inner wall of the interior portion of the enclosure). This gap creates a ligature vulnerability point. As a result, inset door lighting fixtures 100 are not approved for use in anti-ligature or ligature resistant environments or facilities.

To overcome the challenges associated with inset door lighting fixtures 100, lighting fixtures with overlapping doors have been designed for use in anti-ligature or ligature resistant environments or facilities. In use, an overlapping door is arranged and configured to overlap the entire length and width of the lighting fixture including the flange. As such, the overlapping door is directly integrated into the ceiling surface to which the lighting fixture is mounted, thereby eliminating any gaps that may otherwise be a ligature vulnerability point. FIG. 2 illustrates an example overlapping door lighting fixture 200. As illustrated, the overlapping door lighting fixture 200 includes an enclosure 210 having a flange 220 laterally extending therefrom. As will be readily appreciated by one of ordinary skill in the art, in use, the overlapping door lighting fixture 200 is positioned within an opening formed in the ceiling. Once properly positioned, the flange 220 abuts the ceiling and caulk is applied between the flange 220 of the overlapping door lighting fixture 200 and the ceiling surface. Application of the caulk ensures that the overlapping door lighting fixture 200 is properly secured to the ceiling surface. In addition, when used in anti-ligature or ligature resistant environment or facility, the caulk prevents any unwanted ligature vectors. In addition, in connection with overlapping door lighting fixture 200, caulk is applied along the outer edge of the overlapping door 250 to ensure that any gaps between the overlapping door 250 and the enclosure 210 or ceiling surface are eliminated. In use, in anti-ligature or ligature resistant environments or facilities, the caulk is a specialized anti-pick caulk, which is formulated to be resistant to damage from occupants, and be non-toxic.

Thus arranged, overlapping door lighting fixtures 200 eliminate any gaps between the overlapping door 250 and the enclosure 210 of the lighting fixture by having the overlapping door 250 extend the entire length and width of the lighting fixture including the flange. However, as a result of the design and the use of caulk to seal the overlapping door lighting fixtures 200 to the ceiling surface, access by maintenance personnel to the interior of the overlapping door lighting fixtures 200 is rendered more difficult, time-consuming, and costly. That is, in order to access the interior of the enclosure 210, the room must be cleared and the caulk removed. Once any maintenance work is completed, the overlapping door 250 must be resecured, recalked, and allowed to dry before anyone can use the room again.

Thus there remains a need for an improved lighting fixture designed and configured for use in an anti-ligature or ligature resistant environment or facility. In particular, it would be beneficial to provide a lighting fixture utilizing an inset door that is designed and configured for use in an anti-ligature or ligature resistant environment or facility, and which provides for enhanced ease of maintenance. It is with this in mind that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a lighting fixture arranged and configured for use in an anti-ligature or ligature resistant environment or facility. In one embodiment, the lighting fixture includes an enclosure with a flange arranged and configured to abut against a ceiling surface when properly positioned. The lighting fixture is further arranged and configured to include an inset door.

In accordance with one or more features of the present disclosure, the door frame of the inset door includes an angled or beveled edge, wall, or surface along an outer periphery thereof. As a result, in use, the inset door creates a beveled opening when positioned within the enclosure of the lighting fixture. In use, the beveled opening eliminates any channel or access point between the inset door and the enclosure in which an object may be wedged.

In one embodiment, a lighting fixture arranged and configured for use in an anti-ligature or ligature resistant environment or facility is disclosed. The lighting fixture comprises an enclosure including an inner wall defining an interior portion and an inset door arranged and configured to be positioned within the interior portion of the enclosure, the inset door being coupled to the enclosure, wherein the inset door includes an outer periphery including an angled surface comprising non-parallel walls defining an enlarged opening between the inner wall of the enclosure and the angled surface of the inset door.

In one embodiment, the enlarged opening is arranged and configured to prevent an object from being wedged therein.

In one embodiment, the angled surface is between 5 degrees to 85 degrees.

In one embodiment, the angled surface is between 20 degrees to 50 degrees.

In one embodiment, the angled surface defines a triangular opening between the inner wall of the enclosure and the angled surface of the inset door.

In one embodiment, the lighting fixture further comprises a gasket positioned within the interior portion of the enclosure, the gasket arranged and configured to prevent an object from being inserted underneath the outer periphery of the inset door.

In one embodiment, the enclosure further comprises a flange extending laterally outwardly therefrom the flange being arranged and configured to abut a ceiling surface in use.

In one embodiment, the lighting fixture further comprises caulking positioned between the flange and the ceiling surface.

In one embodiment, the interior wall of the enclosure is perpendicular relative to a bottom surface of the enclosure.

In one embodiment, the interior wall of the enclosure is angled relative to a bottom surface of the enclosure.

In one embodiment, the angle of the interior wall of the enclosure and the bottom surface of the enclosure is between 5 degrees to 85 degrees.

In one embodiment, the angle of the interior wall of the enclosure and the bottom surface of the enclosure is between 20 degrees to 50 degrees.

In one embodiment, a method of installing a lighting fixture into an anti-ligature or ligature resistant environment or facility is disclosed. The method comprises positioning the lighting fixture into an opening formed in a ceiling surface of the anti-ligature or ligature resistant environment or facility, the lighting fixture including a flange extending laterally from an enclosure of the lighting fixture, the flange abutting the ceiling surface; caulking the flange to the ceiling surface; and coupling an inset door to an interior portion of the enclosure; wherein the inset door includes an outer periphery including an angled surface comprising non-parallel walls defining an enlarged opening between the inner wall of the enclosure and the angled surface of the inset door.

In one embodiment, the enlarged opening is arranged and configured to prevent an object from being wedged therein.

In one embodiment, the angled surface is between 20 degrees to 50 degrees.

In one embodiment, the angled surface defines a triangular opening between the inner wall of the enclosure and the angled surface of the inset door.

BRIEF DESCRIPTION OF THE DRAWINGS

By way of example, a specific embodiment of the disclosed device will now be described, with reference to the accompanying drawings, in which.

Figure 1:
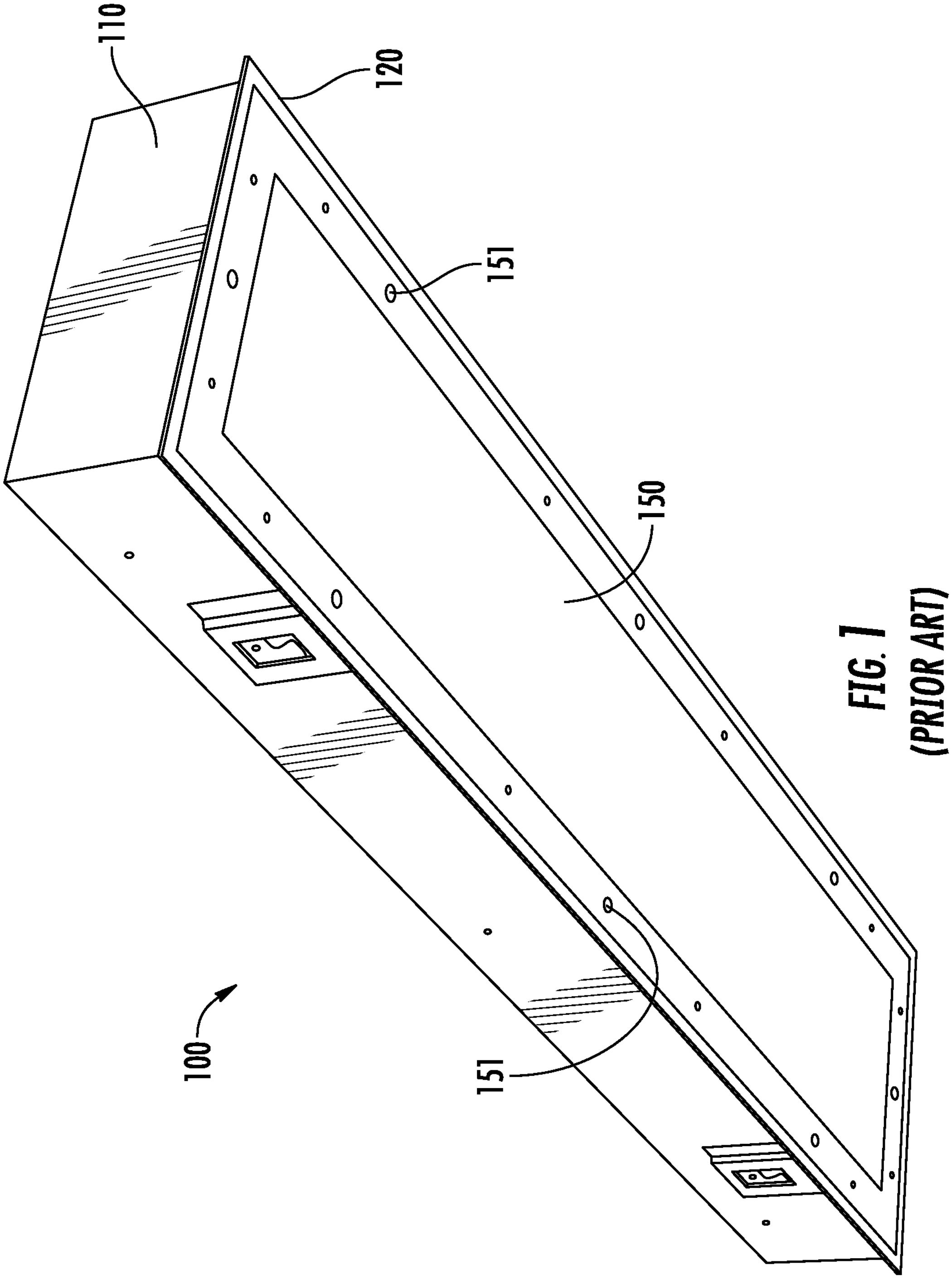
FIG. 1 (PRIOR ART)
FIG. 1 illustrates a perspective view of a known lighting fixture, the lighting fixture including an inset door.
Figure 2:
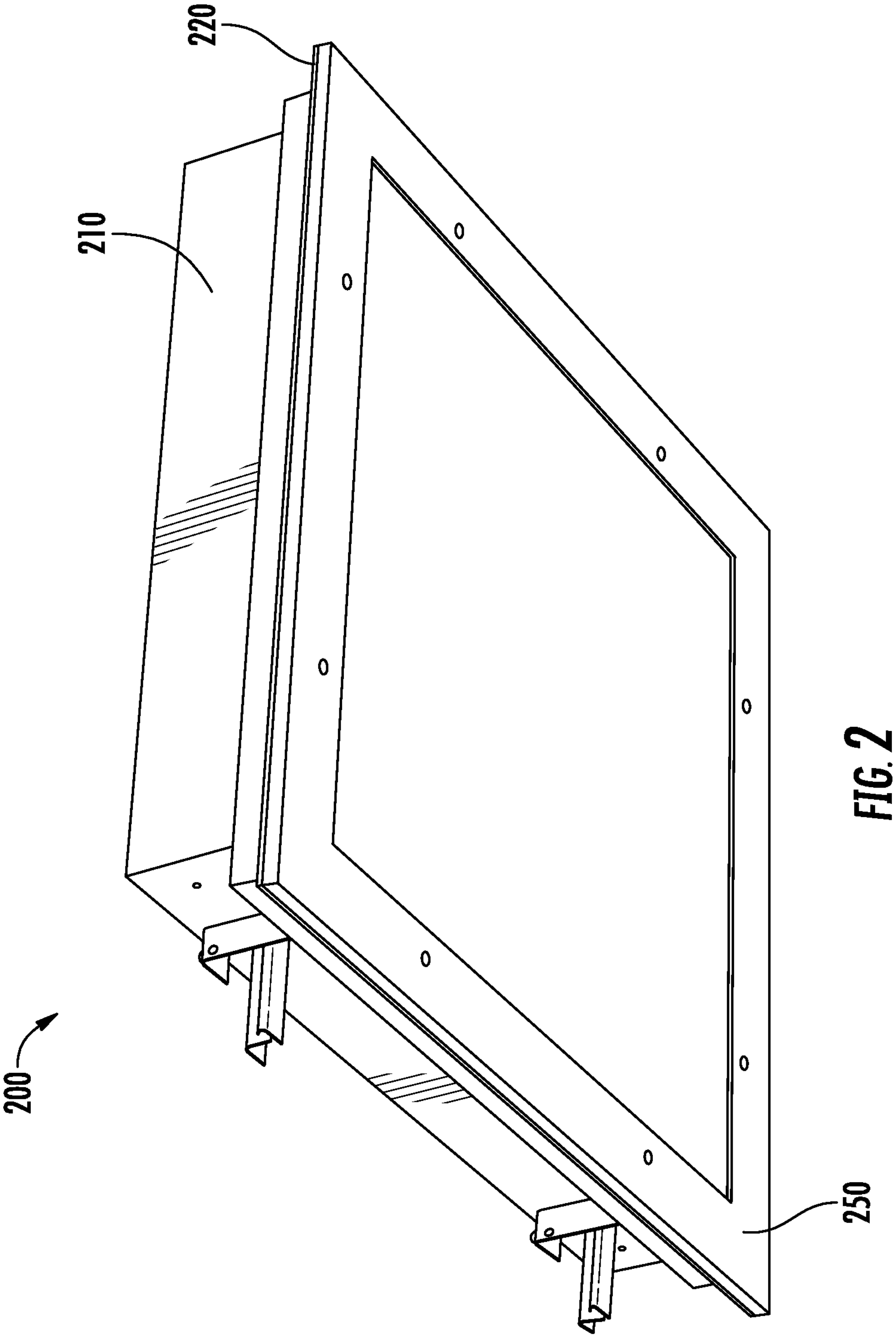
FIG. 2 (PRIOR ART)
FIG. 2 illustrates a perspective view of a known lighting fixture, the lighting fixture including an overlapping door.
Figure 3:
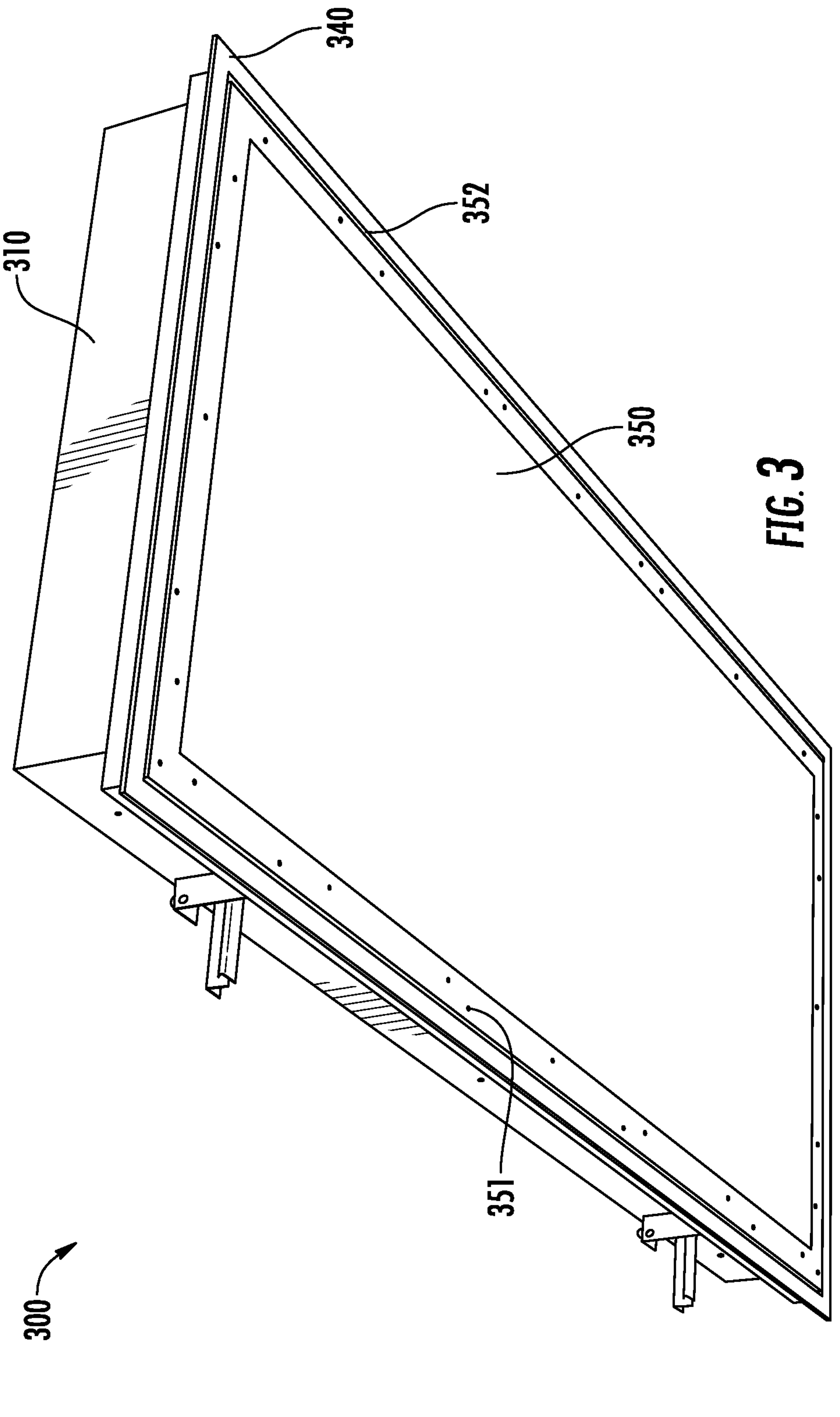
FIG. 3 illustrates a perspective view of an embodiment of a lighting fixture in accordance with one or more features of the present disclosure, the lighting fixture including an inset door.
Figure 4:
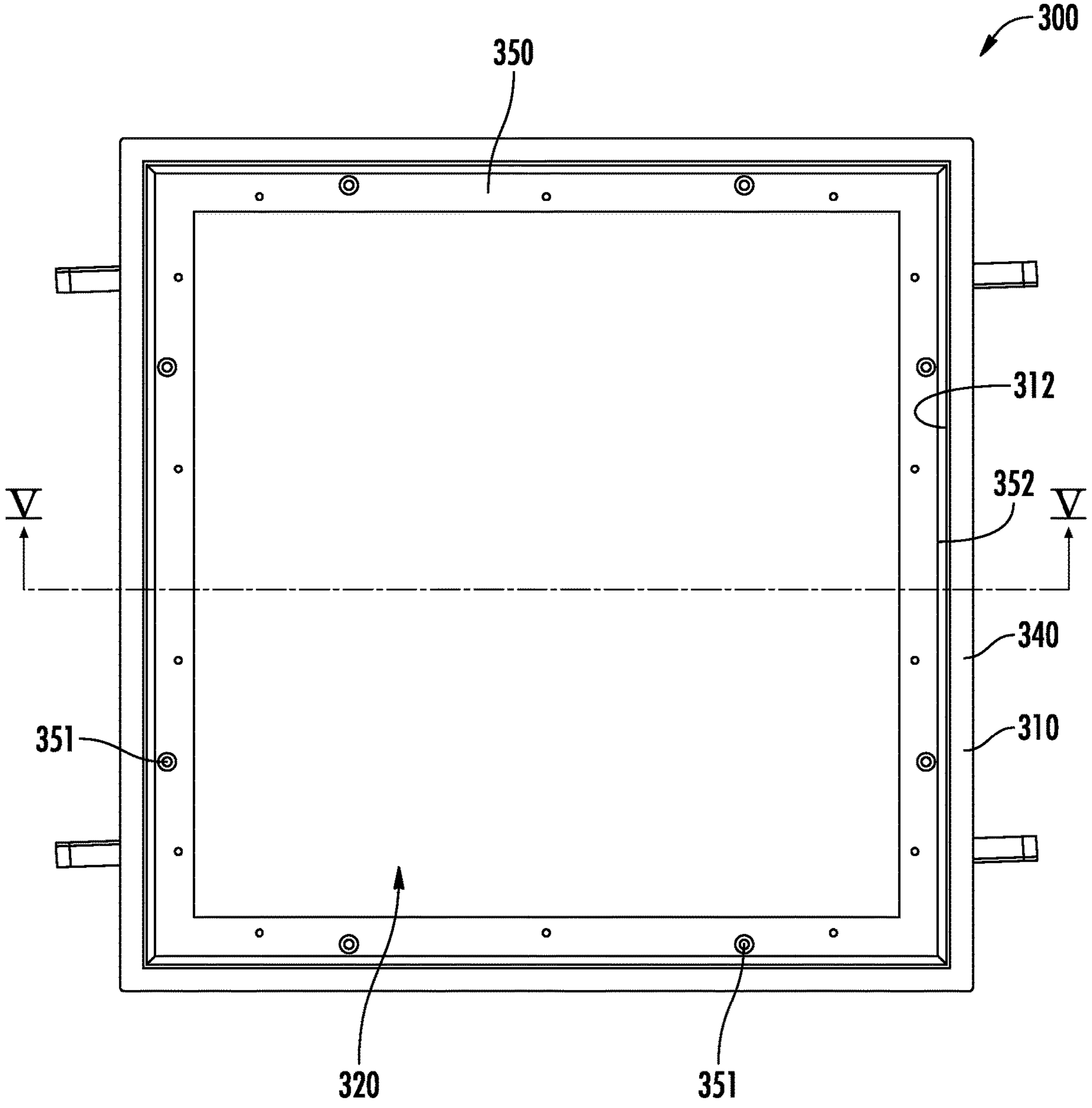
FIG. 4 illustrates a plan view of the lighting fixture shown in FIG. 3.
Figure 5:
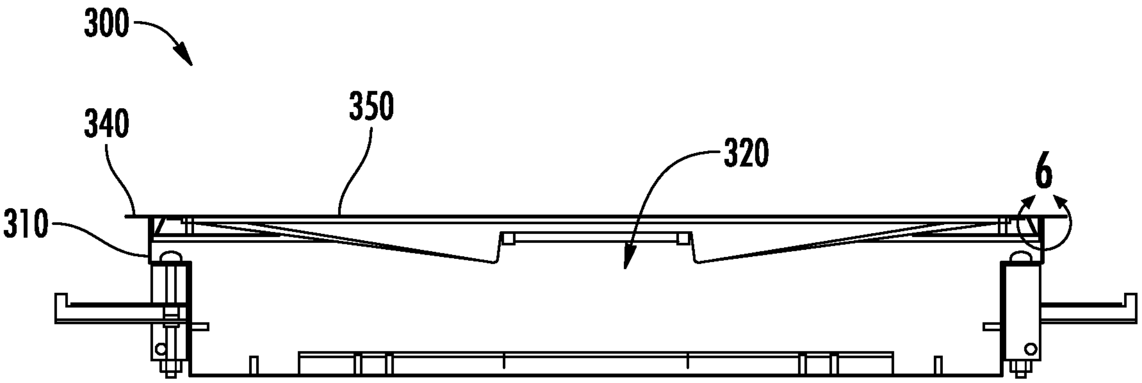
FIG. 5 illustrates a cross-sectional view of the lighting fixture shown in FIG. 4, taken along line V-V in FIG. 4.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein. In the drawings, like numbers refer to like elements throughout unless otherwise noted.

DETAILED DESCRIPTION

Various features or the like of a lighting fixture utilizing an inset door will now be described more fully hereinafter with reference to the accompanying drawings, in which one or more features of the lighting fixture utilizing an inset door will be shown and described. It should be appreciated that the various features may be used independently of, or in combination, with each other. It will be appreciated that the lighting fixture utilizing an inset door may be embodied in many different forms and should not be construed as being limited to the embodiments set forth herein. Rather, these embodiments are provided so that this disclosure will convey certain features of the lighting fixture utilizing an inset door to those skilled in the art.

In accordance with one or more features of the present disclosure, the lighting fixture utilizing an inset door is arranged and configured for use in an anti-ligature or ligature resistant environment or facility. In particular, in accordance with one or more features of the present disclosure, the lighting fixture includes a beveled edge, wall, frame, or surface (terms used interchangeably herein without the intent to limit or distinguish) between the inner surface or wall of the enclosure and the outer surface of the inset door. As will be described in greater detail below, in one embodiment, the inset door includes a beveled or angled edge, wall, frame, or surface. The interior wall of the enclosure may be straight or angled. As a result, any opening, gap, or channel (terms used interchangeably herein without the intent to limit or distinguish) between the beveled wall of the inset door and the interior wall of the enclosure in which an object may be wedged is eliminated. This is in contrast to known lighting fixtures utilizing inset doors in which the inset door has a ninety-degree bend along the interior wall of the enclosure. As such, known lighting fixtures utilizing inset doors include a gap or a channel with parallel walls wherein cloths or strings may be inserted and hooked or in which other objects may be wedged, thereby creating ligature vulnerability points. Known lighting fixtures utilizing inset doors include a gap or a channel with parallel walls providing a point where an object can be introduced and be used to leverage force against the frame of the inset door to create a gap between the inset door and the enclosure under which a string, a shoelace, or other ligature material could be secured. This issue is compounded by measurement tolerances during manufacturing which may result in larger gap sizes.

As will be described herein, by incorporating the beveled surface, any channel or gap between the enclosure and the inset door in which an object may be wedged or hooked is eliminated thereby enabling a lighting fixture with an inset door to be used in an anti-ligature or ligature resistant environment or facility. That is, by utilizing one or more features of the present disclosure, a lighting fixture with an inset door may be used in an anti-ligature or ligature resistant environment or facility. As such, all of the advantages associated with inset door lighting fixtures may now be used in anti-ligature or ligature resistant environments or facilities. For example, easy access to the interior of the lighting fixture for maintenance purposes may be provided without the need to remove and replace specialized anti-pick caulking associated with overlapping door lighting fixtures.

Referring to FIGS. 3-6, an example embodiment of a lighting fixture 300 is shown. As illustrated, the lighting fixture 300 includes a housing or enclosure 310 including an inner wall or surface 312 defining an interior portion 320. In use, the interior portion 320 is arranged and configured to house or enclose lighting components and/or circuitry such as, for example, light bulbs, LEDs, drivers, etc. The lighting fixture 300 also includes an inset door 350. In use, the inset door 350 is arranged and configured to be positioned within the interior portion 320 as defined by the inner wall or surface 312. In use, the inset door 350 may be coupled to the enclosure 310 via a plurality of screws or fasteners 351 to enable easy access to the interior portion 320 of the enclosure 310 by maintenance personnel.

As illustrated, the enclosure 310 may also include a flange 340 extending laterally therefrom. In use, as will be readily appreciated by one of ordinary skill in the art, with the lighting fixture 300 positioned within an opening formed in a ceiling surface, the flange 340 is arranged and configured to abut the ceiling surface. The flange 340, when used in anti-ligature or ligature resistant environment or facility, may be caulked to the ceiling surface to eliminate or remove any ligature vulnerability points between the lighting fixture 300 and the ceiling surface.

Figure 6:
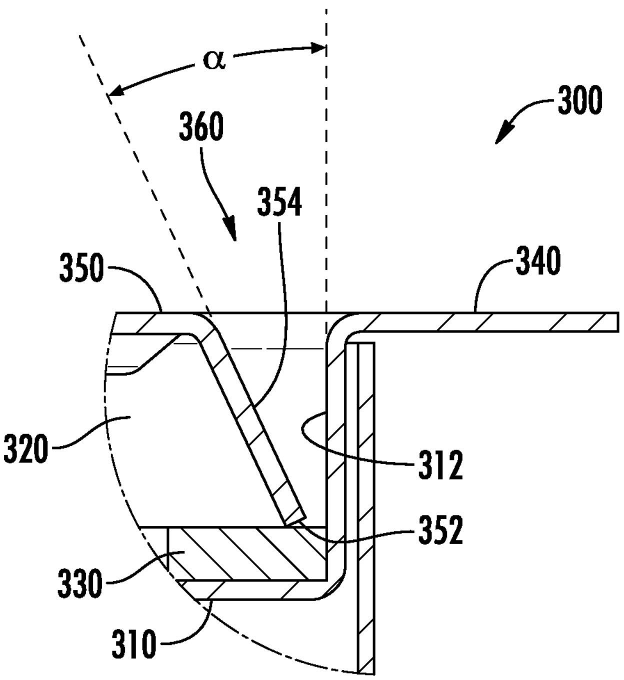
FIG. 6 illustrates a detailed view of the lighting fixture shown in FIG. 3.

In accordance with one or more features of the present disclosure, the inset door 350 includes an outer periphery 352, the outer periphery 352 including an angled or beveled surface or section 354 (FIG. 6). That is, the surface of section 354 forms an acute angle with respect to the surface of the inner wall 312 of the enclosure 310. In the illustrated embodiment, the angled or beveled surface or section 354 defines an enlarged opening 360 between the inner wall or surface 312 of the enclosure 310 defining the interior portion 320 and the angled or beveled surface or section 354 defining the outer periphery 352 of the inset door 350 (e.g., the opening 360 is enlarged as compared to known lighting fixtures that utilize parallel walls between the outer wall or periphery of the inset door and the inner wall of the interior portion of the enclosure). As such, in use, utilization of an angled or beveled surface or section 354 to form an acute angle with respect to the surface of the inner wall 312 of the enclosure 310 produces an enlarged or widened opening or gap comprising of non-parallel walls.

In one embodiment, as illustrated, the enlarged opening 360 may have a generally triangular shape, although other shapes are envisioned such as, for example, a rounded shape, a trapezoidal shape, etc. The enlarged opening 360 comprising of non-parallel walls prevents occupants from wedging any objects into the opening 360. This is in contrast to known lighting fixtures utilizing inset doors where the parallel walls define a gap between the inset door and the interior portion of the enclosure that can be used to wedge material therein and thus create a ligature vulnerability point. While the outer periphery 352 has been described and illustrated as including an angled or beveled surface or section 354, it should be understood that the outer periphery 352 may include other shapes to form the enlarged opening 360 such as, for example, a concave surface or the like.

As illustrated in FIG. 6, the lighting fixture 300 may also include a gasket 330 positioned within the interior portion 320 of enclosure 310 to provide a watertight seal between the inset door 350 and the enclosure 310 to facilitate spray down or washing of the lighting fixture 300. In use, the gasket 330 may be compressed by the inset door 350 when the plurality of screws 351 used to couple the inset door 350 to the enclosure 310 are tightened. In addition, the gasket 330 acts as a barrier to prevent, for example, string such as, for example, Teflon, etc. from being inserted underneath the inset door 350.

In one embodiment, the acute angle defined by the angled or beveled surface or section 354 and the inner wall 312 of the enclosure 310 may define an angle $\alpha$. In one embodiment, angle $\alpha$ may be from 5 degrees to 85 degrees, more preferably from 10 degrees to 70 degrees, and more preferably between 20 degrees and 50 degrees. In one embodiment, the angle $\alpha$ may be 25 degrees. In addition, and/or alternatively, in one embodiment, the interior wall 312 of the enclosure 310 may be straight (e.g., perpendicular relative to a bottom surface of the interior portion 320 of the enclosure 310) or angled. In one embodiment, the acute angle defined by the interior wall 312 of the enclosure 310 may define an angle. In one embodiment, the angle may be from 5 degrees to 85 degrees, more preferably from 10 degrees to 70 degrees, and more preferably between 20 degrees and 50 degrees. In one embodiment, the angle may be 25 degrees.

In use, the lighting fixture may be installed by positioning the lighting fixture into an opening formed in a ceiling surface of the anti-ligature or ligature resistant environment or facility. The lighting fixture including a flange extending laterally from an enclosure of the lighting fixture, the flange abutting the ceiling surface. Next, the installer may caulk the flange to the ceiling surface. In one embodiment, in accordance with one or more features of the present disclosure, the lighting fixture includes an inset door coupled to the enclosure of the lighting fixture via a plurality of fasteners. The inset door includes an outer periphery including an angled surface defining an enlarged opening between the inner wall of the enclosure and the angled surface of the inset door.

The foregoing description has broad application. While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments. Rather these embodiments should be considered as illustrative and not restrictive in character. All changes and modifications that come within the spirit of the invention are to be considered within the scope of the disclosure. The present disclosure should be given the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. Unless otherwise defined, all technical terms used herein have the same meaning as commonly understood by one of ordinary skill in the art to which the disclosure belongs.

Directional terms such as top, bottom, superior, inferior, medial, lateral, anterior, posterior, proximal, distal, upper, lower, upward, downward, left, right, longitudinal, front, back, above, below, vertical, horizontal, radial, axial, clockwise, and counterclockwise) and the like may have been used herein. Such directional references are only used for identification purposes to aid the reader's understanding of the present disclosure. Such directional references do not necessarily create limitations, particularly as to the position, orientation, or use of this disclosure. As such, directional references should not be limited to specific coordinate orientations, distances, or sizes, but are used to describe relative positions referencing particular embodiments. Such terms are not generally limiting to the scope of the claims made herein. Any embodiment or feature of any section, portion, or any other component shown or particularly described in relation to various embodiments of similar sections, portions, or components herein may be interchangeably applied to any other similar embodiment or feature shown or described herein.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. Furthermore, references to "one embodiment" of the present disclosure are not intended to be interpreted as excluding the existence of additional embodiments that also incorporate the recited features.

In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited. It will be further understood that the terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

The phrases "at least one", "one or more", and "and/or", as used herein, are open-ended expressions that are both conjunctive and disjunctive in operation. The terms "a" (or "an"), "one or more" and "at least one" can be used interchangeably herein.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

What is claimed is:

1. A lighting fixture arranged and configured for use in an anti-ligature or ligature resistant environment or facility, the lighting fixture comprising:

an enclosure including an inner wall defining an interior portion; and an inset door arranged and configured to be positioned within the interior portion of the enclosure, the inset door being coupled to the enclosure;

wherein the inset door includes an outer periphery including an angled surface comprising non-parallel walls defining an enlarged opening between the inner wall of the enclosure and the angled surface of the inset door; and wherein the interior wall of the enclosure is perpendicular relative to a bottom surface of the enclosure.

2. The lighting fixture of claim 1, wherein the enlarged opening is arranged and configured to prevent an object from being wedged therein.

3. The lighting fixture of claim 1, wherein the angled surface is between 5 degrees to 85 degrees.

4. The lighting fixture of claim 1, wherein the angled surface is between 20 degrees to 50 degrees.

5. The lighting fixture of claim 1, wherein the angled surface defines a triangular opening between the inner wall of the enclosure and the angled surface of the inset door.

6. The lighting fixture of claim 1, further comprising a gasket positioned within the interior portion of the enclosure, the gasket arranged and configured to prevent an object from being inserted underneath the outer periphery of the inset door.

7. The lighting fixture of claim 1, wherein the enclosure further comprises a flange extending laterally outwardly therefrom, the flange being arranged and configured to abut a ceiling surface in use.

8. The lighting fixture of claim 7, further comprising caulking positioned between the flange and the ceiling surface.

9. A method of installing a lighting fixture into an anti-ligature or ligature resistant environment or facility, the method comprising:

positioning the lighting fixture into an opening formed in a ceiling surface of the anti-ligature or ligature resistant environment or facility, the lighting fixture including a flange extending laterally from an enclosure of the lighting fixture, the flange abutting the ceiling surface;

caulking the flange to the ceiling surface; and coupling an inset door to an interior portion of the enclosure;

wherein the inset door includes an outer periphery including an angled surface comprising non-parallel walls defining an enlarged opening between an interior wall of the enclosure and the angled surface of the inset door; and wherein the interior wall of the enclosure is perpendicular relative to a bottom surface of the enclosure.

10. The method of claim 9, wherein the enlarged opening is arranged and configured to prevent an object from being wedged therein.

11. The method of claim 9, wherein the angled surface is between 20 degrees to 50 degrees.

12. The method of claim 9, wherein the angled surface defines a triangular opening between the inner wall of the enclosure and the angled surface of the inset door.

* * * * *